United States Patent Office 3,372,002
Patented Mar. 5, 1968

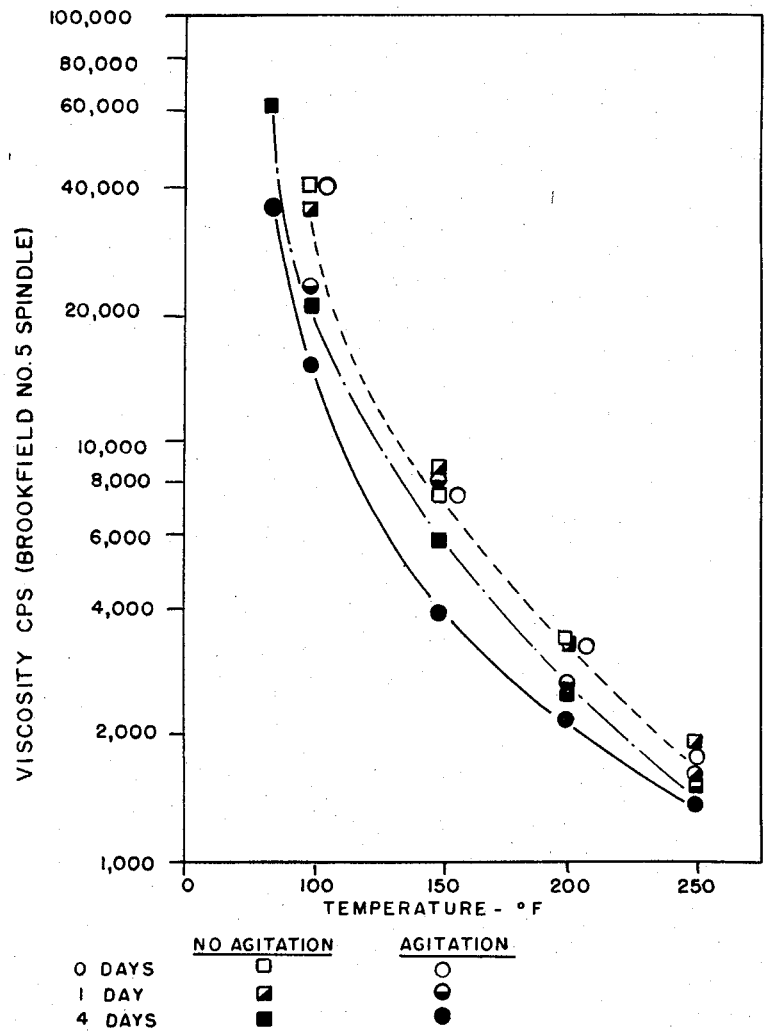

3,372,002
VISCOSITY REDUCTION OF WET PROCESS SUPERPHOSPHORIC ACID
Robert C. Mazurek and Phillip E. Hynson, Lakeland, Fla., assignors, by mesne assignments, to Armour Agricultural Chemical Company, a corporation of Delaware
Filed Dec. 2, 1965, Ser. No. 514,431
3 Claims. (Cl. 23—293)

This invention relates to viscosity reduction of wet process superphosphoric acid.

Superphosphoric acid is generally used to define concentrated phosphoric acids having a range of $P_2O_5$ content of from about 68 weight percent to 78 weight percent $P_2O_5$ and higher. Such superphosphoric acids, when cooled by natural convection, are usually gel-like and very viscous. Because of the increased viscosity of the acids, many workers have been reluctant to concentrate the acids beyond lower concentrations where the acid has substantial fluidity.

We have discovered that if wet process superphosphoric acid is agitated, aged for a substantial time, such as one to two days or more at a temperature of about 150–220° F., and allowed to settle, a significant reduction in viscosity occurs. A primary object, therefore, of the invention is to provide a process for aging and agitating superphosphoric acid at elevated temperatures to reduce the viscosity thereof. A further object is to bring about a viscosity reduction of wet process superphosphoric acid by aging the same over a period of one day or more at an elevated temperature while keeping the acid in agitation. Other specific objects and advantages will appear as the specification proceeds.

In one embodiment of the invention, wet process superphosphoric acid, as, for example, 72 weight percent or 78 weight percent $P_2O_5$, is aged for one or two days at about 200° F. while the acid is agitated. After the aging process, there is found to be a significant reduction in the viscosity of the acid.

The process may be utilized immediately after the phosphoric acid is concentrated by heat in an evaporator to the superphosphoric acid range, but instead of allowing the acid to be cooled by natural convection to around room temperature, the acid is held at the evaporator discharge temperature down to around 150° F. and kept in a state of agitation for a period of one to two days or more. After the aging period, the acid may then be allowed to cool to the ambient temperature.

The aging with agitation process may be carried out with substantial variation in the time and temperature conditions. We prefer, however, to maintain the temperature at about 150–220° F., with the preferred temperature range being 180–200° F. The time of aging may vary from one days to four days or more. It is important that agitation be carried on during the aging period. Aging without agitation at elevated temperatures, even as high as 250° F., produces no reduction in viscosity of the acid after the aging period.

Why the agitation accompanied by an elevated temperature for an aging period brings about a significant reduction in the viscosity of wet process phosphoric acid, we are not able to state; however, it is possible that this phenomenon is the result of reorientation of the inorganic polymeric structures by forming shorter chain lengths or partial crystallization of the gels.

Specific examples illustrative of our process may be set out as follows:

*Example I*

A sample of 72% wet process superphosphoric acid was divided into two samples. One sample was not treated. The other sample was aged for two days at 200° F. and kept in agitation.

The process was repeated with a sample of 78% wet process superphosphoric acid, the sample being divided and one-half thereof subjected to an aging process for a period of 1½ days at about 200° F. and kept in agitation during that time. The results of the foregoing tests are set out in the following table:

TABLE I

| Acid Sample | Viscosity (centipoises) at— | |
|---|---|---|
| | 195° F. | 80° F. |
| 72% Untreated | 900 | 29,000 |
| 72% Treated | 420 | 16,000 |
| 78% Untreated | 680 | 20,000 |
| 78% Treated | 380 | 12,000 |

*Example II*

A settled sample of wet process 54% $P_2O_5$ acid was evaporated on a hot plate to a temperature of 310–313° C. The sample was split into two portions and placed in sealed Mason jars. The viscosity of the acid was taken at the time (0 days). The two samples were placed in a water bath, kept at 180° F. and viscosities were taken after one and four days immersion. One of the jars was agitated while keeping it sealed so as to prevent moisture from leaking into the sample. The results of the tests are set out in the drawing. From the drawing, it will be seen that at 70° F. the unagitated sample had a viscosity of 62,000 centipoises, while the agitated sample had a viscosity of 35,000 centipoises, after four days aging. The viscosity reduction effect was greatest at the lower temperatures, while above 200° F. very little improvement in the reduction of viscosity was found.

*Example III*

A sample of wet process 54% $P_2O_5$ acid was split into two portions, one sample centrifuged three minutes at 2000 r.p.m., the supernatant decanted and the supernatant labeled "low solids." The other sample was not centrifuged. The first sample residue and other sample were then heated on a hot plate to a temperature of 325° C., placed in separate, sealed Mason jars, and aged, without agitation, in a constant temperature oven at 250° F. It was found that aging at the elevated temperature without agitation brought about no reduction in viscosity of the two samples after four days' aging.

While in the foregoing specification we have set out specific procedure in considerable detail for the purpose of illustrating embodiments of the invention, it will be understood that such details of operation may be varied widely by those skilled in the art without departing from the spirit of our invention.

We claim:

1. In a process for reducing the viscosity of wet process superphosphoric acid having a $P_2O_5$ content of at least 68 weight percent, the steps of aging said acid for at least a day at a temperature in the range of about 180–220° F. while keeping the acid in a state of agitation, and thereafter allowing the acid to cool to the ambient temperature.

2. The process of claim 1 in which the temperature is maintained at about 200° F.

3. In a process for reducing the viscosity of wet process superphosphoric acid of about 68–78 weight percent $P_2O_5$, the steps of aging said acid for at least a day in the range of about 180–220° F. while agitating the acid to keep it in motion and thereafter allowing the acid to cool.

References Cited

UNITED STATES PATENTS

| | | | |
|---|---|---|---|
| 2,936,888 | 5/1960 | Williams | 210—71 |
| 3,119,662 | 1/1964 | Viventi et al. | 23—165 |
| 3,206,282 | 9/1965 | Crawford et al. | 23—165 |

OTHER REFERENCES

"Inorganic Chemical Technology," Badger, W. L. and Baker, E. M., McGraw-Hill Book Company, New York (1941), pp. 195, 196, 202.

"American Petroleum Refining," 2nd ed., Bell, H. S., Van Nostrand Company, New York (1930), pp. 260, 267–8.

"Industrial Chemistry," 3rd ed., Riegel, E. R., Reinhold Publishing Company, pp. 136–137.

NORMAN YUDKOFF, *Primary Examiner.*

J. SOFER, *Assistant Examiner.*